March 2, 1943.     D. C. GOULD ET AL     2,312,544
DISPENSING DEVICE
Filed April 15, 1940
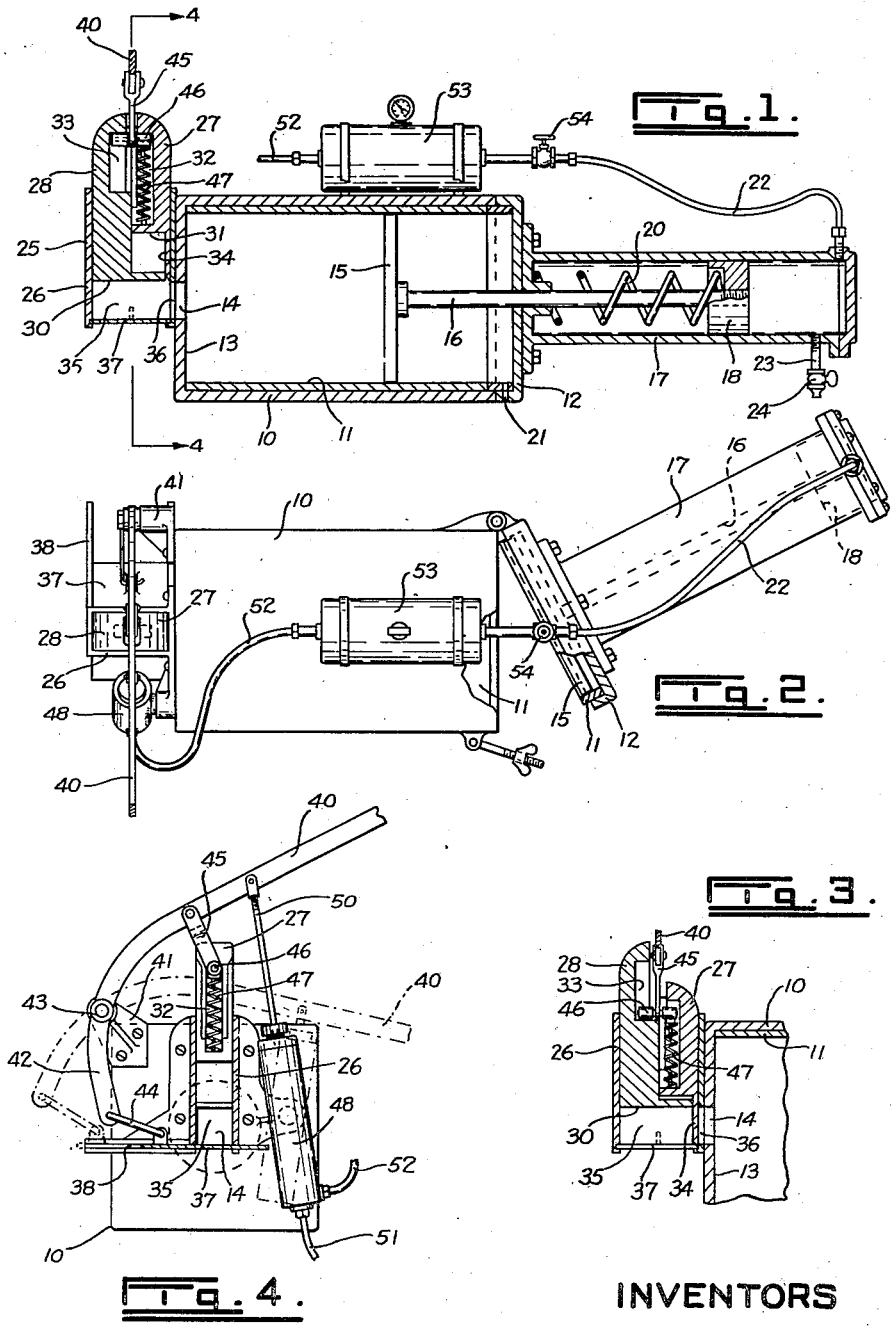
INVENTORS
David Calvert Gould.
and Robert Kenneth Lusk.
BY: Eugene E. Stevens
ATTORNEY Patented Mar. 2, 1943

2,312,544

UNITED STATES PATENT OFFICE 2,312,544

DISPENSING DEVICE

David Calvert Gould and Robert Kenneth Lusk, Vancouver, British Columbia, Canada Application April 15, 1940, Serial No. 329,794

6 Claims. (Cl. 31—8)

This invention relates to a dispensing device for plastic substances or commodities, such as butter, lard, grease or the like.

An object of the present invention is the provision of a device for dispensing predetermined quantities of plastic substances.

Another object is the provision of a device for dispensing plastic substances or commodities which eliminates the necessity of human hands coming into contact therewith during the dispensing thereof.

Another object is the provision of a device particularly for dispensing predetermined quantities of butter in restaurants, hotels or the like, where it is desired to give each customer a certain quantity of butter.

A further object is the provision of a device for forming and dispensing neatly trimmed and shaped quantities of a plastic substance.

A further object is the provision of a dispensing device for plastic substances which, in one operation, discharges a quantity of the substance and reloads the discharge mechanism thereof for the next operation.

This device may be used for dispensing any desired plastic or semi-plastic substance in predetermined quantities for any purpose whatsoever, but it is particularly designed for forming pats of butter of a certain weight and size in places where such are required. At the present time, in most restaurants, and particularly the smaller ones, the butter is manually cut into the required size and shape and then is placed upon plates for the customers. This, of necessity, entails considerable handling and as the hands are warm, fingerprints are usually left on the butter, a very unappetizing sight for the customer. It is the aim of this invention to provide a device for forming and then dispensing the butter pats directly on to the plates, thus eliminating any necessity for direct handling.

With these and other objects in view, the present invention consists essentially of a dispensing device for plastic substances or the like comprising a chest for receiving a quantity of the substance, means for applying pressure to the substance in the chest, a chamber communicating with the interior of the chest adapted to receive a predetermined quantity of the substance therefrom under pressure, and means for discharging the substance from said chamber, as more fully described in the following specification and illustrated in the accompanying drawing, in which Figure 1 is a longitudinal sectional view of the dispensing device with the operating handle in its uppermost position, Figure 2 is a plan view of the device which is open for loading, Figure 3 is a fragmentary sectional view through the discharge mechanism after the operating handle has been moved substantially half way through its stroke, and Figure 4 is a vertical section through the discharge mechanism taken substantially along the line 4—4 of Figure 1, the rest of the device being in elevation.

Referring more particularly to the drawing, 10 is a relatively long chest which may be any desired shape, the one illustrated being rectangular, and a lining 11 formed of a suitable material covers the walls of this chest. The rearward end of the chest is open and a cover 12 is hingedly mounted thereon by means of which the chest end may be closed. The forward end of the chest is closed by a wall 13 which has an opening 14 formed therein substantially centrally thereof.

A ram 15 slidably mounted in the chest 10, has a piston rod 16 projecting rearwardly therefrom through the cover 12 into a cylinder 17 mounted on the outer surface of the cover, said rod being connected at its outer end to a piston 18 operatively mounted in this cylinder. A coil spring 20 embracing the piston rod 16 and extending from the inner end of the cylinder 17 to the piston 18, tends to urge said piston towards the outer end of its cylinder (towards the right in Figure 1) and, consequently, urges the ram 15 in the same direction towards the cover 12 of the chest 10. It will be noted that the cover 12 is shaped to receive the ram 15 so that the latter may be completely withdrawn from the chest into said cover when it is desired to load the chest. An air hole 21 is formed in the cover 12 to permit the air to escape therefrom when the ram is drawn thereinto by the action of the spring 20. A fluid, such as oil, is supplied to the cylinder beyond the piston 18 through a pipe 22 while said fluid may be removed therefrom through a drain pipe 23 having a control cock 24 which is connected to a fluid reservoir (not shown).

A discharge mechanism 25 is mounted upon the end wall 13 of the chest 10. This mechanism consists of a casing 26 located over the opening 14 and inner and outer plungers 27 and 28, respectively, slidably mounted therein side by side. The bottom 30 of the outer plunger projects inwardly beneath the inner plunger almost to the wall of the casing 26 while the bottom 31 of the inner plunger is normally spaced above the projected portion of the bottom 30. The plungers 27 and 28 are formed with respective slots 32 and 33 in the inner surfaces thereof, the tops of these slots lying in the same plane when said plungers are in their uppermost positions but the slot 32 is somewhat longer than the slot 33. A blade 34 extends downwardly from the side of the inner plunger 27 adjacent the chest 10, through the space between the outer end of the projected portion of the bottom 30 and the casing 26 and when the plunger is in its uppermost position, the blade merely extends down to said bottom 30, see Figure 1. The plungers 27 and 28 are normally held above the lower end of the casing 26 so that a chamber 35 is formed therein beneath said plungers, and an opening 36 is formed in the casing in registry with the opening 14, thus bringing the chamber 35 into communication with the interior of the chest 10. The lower end of the casing 26 is open and a cut-off blade 37 movably mounted in a slideway 38, see Figure 4, may be moved transversely of the device to close the lower end of the casing, said blade being considerably larger than the casing end.

An operating handle 40 is pivotally mounted on a bracket 41 supported by the chest 10. This handle is provided with an extension 42 beyond the pivot 43 thereof and the inner end of said extension is connected to one end of the blade 37 by a link 44. Another link 45 extends downwardly from the operating handle between the plungers 27 and 28 while a pin 46 located at the outer end of this link, extends freely into the slots 32 and 33 of said plungers. A spring 47 lies between the pin 46 and the lower end of the slot 32.

The fluid may be pumped into the cylinder 17 in any suitable manner but it is preferred to mount a pump 48 upon the forward end of the chest 10 and to connect the plunger rod 50 thereof to the operating handle 40. A pipe 51 connects the pump to the reservoir to which the drain pipe 23 is connected. A pressure pipe 52 may connect the pump directly to the pipe 22 or it may extend to a pressure tank 53, in which case the pipe 22 is also connected to said tank and is provided with a valve 54.

When it is desired to load the dispensing device, the cover 12 is opened, as illustrated in Figure 2, and the plastic substance or commodity say, for example, butter is placed in the chest 10. Then the cover is closed and securely held in position by any suitable means. When fluid is pumped into the cylinder 17, the piston 18 and the ram 15 are moved forwardly to exert pressure upon the butter to force a quantity thereof through the openings 14 and 36 to fill the chamber 35. The pressure upon the butter is maintained by the pump 48 which is operated each time the handle 40 is moved downwardly. In this way, the butter is constantly maintained under pressure regardless of the fact that quantities thereof are being removed from the chest and at the same time, the chamber 35 is always filled when the openings 14 and 36 are open.

During the first part of the downward movement of the operating handle, the inner plunger 27 and consequently the blade 34 are moved downwardly owing to the link 45, pin 46 and spring 47. This severs the butter in the chamber 35 from the main bulk in the chest 10 and closes the openings 14 and 36 to disconnect said chamber from the chest. Once this has been done, further movement of the handle draws the blade 37 away from the bottom of the casing 26 to open said casing. When the blade 34 has reached its lowermost position and the blade 37 has been withdrawn from the casing 26, the pin 46 engages the lower end of the slot 33 so that any further movement of the operating handle moves the plunger 28 downwardly to discharge the butter from the chamber 35. During this latter movement, the plunger 27 remains stationary, the compression spring 47 permitting the pin 46 to move downwardly.

As the handle 40 is moved upwardly, the blade 37 is moved back across the bottom of the casing 26 cleanly to cut off the pat of butter hanging therefrom and to close the bottom of the casing. During this part of the movement, the blade 34 and the plungers 27 and 28 remain stationary until the pin 46 reaches the top of the slots 32 and 33, after which the blade and the plungers are moved upwardly to open the openings 14 and 36 to permit the chamber to be refilled with butter from the chest 10.

When it is desired to load the chest, the valve 54 is closed and the cock 24 is opened to drain the cylinder 17 to permit the spring 29 to move the piston 18 and the ram 15 to their outermost positions. Once the loading is completed, the valve 54 is opened again so that the cylinder is filled with fluid under pressure instantly to apply pressure upon the new butter in the chest.

While hydraulic means has been described and illustrated for applying pressure to the butter, it will be understood that any other suitable means may be employed for this purpose.

This dispensing device forms and discharges pats of butter the same size as the chamber 35. The size of each pat may be regulated by raising or lowering the plungers 27 and 28 to increase or decrease the size of the chamber. If this device is to be used for other purposes, the discharge mechanism would be constructed in accordance with the desired size of the final product to be discharged therefrom.

There are numerous variations of the above-described device. For example, the cut-off blade 37 may be omitted and the butter cut away by an ordinary hand knife, and/or the set up of the blade 34 may be varied. It would be possible to have a single plunger in the casing 26 and a short blade 34 extending downwardly therefrom. In this case, the blade as it is moved downwardly would cut the butter in the chamber 35 away from that in the chest and the single plunger would gradually cut off the pressure from said butter as well as discharge it from the chamber. If desired, suitable cooling means may be provided for the chest 10.

Various modifications may be made in this invention without departing from the spirit thereof or the scope of the claims, and, therefore, the exact forms shown are to be taken as illustrative only and not in a limiting sense, and it is desired that only such limitations shall be placed thereon as are set forth in the accompanying claims.

What we claim as our invention is:

1. A dispensing device for plastic substances or the like comprising a chest for receiving a quantity of the substance, means for applying pressure to the substance in the chest, an open-ended casing carried by the chest, a plunger slidably mounted in the casing, a chamber in the casing beneath the plunger communicating with the interior of the chest, said chamber being adapted to receive a predetermined quantity of the substance under pressure from the chest, a handle by means of which the plunger may be moved downwardly through the chamber to discharge the substance therefrom, and means operated by the handle for maintaining the pressure on the substance in the chest to compensate for the substance removed therefrom.

2. A dispensing device for plastic substances or the like comprising a chest for receiving a quantity of the substance, means for applying pressure to the substance in the chest, an open-ended casing carried by the chest, inner and outer plungers slidably mounted in the casing, the bottom of the latter being above that of the former, a chamber in the casing beneath the plungers communicating with the interior of the chest, said chamber being adapted to receive a predetermined quantity of the substance under pressure from the chest, a blade extending downwardly from the inner plunger past the outer plunger adapted selectively to disconnect the chamber from the chest, and a handle for successively moving the inner and outer plungers with the blade of the former downwardly to disconnect the chamber and discharge the substance therefrom.

3. A dispensing device for plastic substances or the like comprising a chest for receiving a quantity of the substance, means for applying pressure to the substance in the chest, an open-ended casing carried by the chest, a plunger slidably mounted in the casing, a chamber in the casing beyond the plunger communicating with the interior of the chest, said chamber being adapted to receive a predetermined quantity of the substance under pressure from the chest, a cut-off blade slidably mounted at the open end of the casing, said blade being movable to close said open end, and a handle for successively moving the plunger through the chamber to discharge the substance therefrom and then to move the cut-off blade across the casing opening to cut the substance away from the device.

4. A dispensing device for plastic substances or the like comprising a chest for receiving a quantity of the substance, means for applying pressure to the substance in the chest, an open-ended casing carried by the chest, a plunger slidably mounted in the casing, a chamber in the casing beneath the plunger communicating with the interior of the chest, said chamber being adapted to receive a predetermined quantity of the substance under pressure from the chest, a cut-off blade slidably mounted at the lower end of the casing, said blade being movable to close the opening in said lower end, and a pivotally mounted handle connected on one side of the pivot to the plunger and on the other side thereof to the cut-off blade, said handle being adapted successively to move the plunger through the chamber to discharge the substance therefrom and then to move the cut-off blade across the casing opening to cut the substance away from the device.

5. A dispensing device for plastic substances or the like comprising a chest for receiving a quantity of the substance, means for applying pressure to the substance in the chest, an open-ended casing carried by the chest, a plunger slidably mounted in the casing, a chamber in the casing beyond the plunger communicating with the interior of the chest, said chamber being adapted to receive a predetermined quantity of the substance under pressure from the chest, a blade slidably mounted in the casing adapted selectively to disconnect the chamber from the chest, a cut-off blade slidably mounted at the open end of the casing, said blade being movable to close said open end, and common means for successively moving the first blade to disconnect the chamber, moving the plunger through the chamber to discharge the substance therefrom, and then moving the cut-off blade across the casing opening to cut the substance away from the device.

6. A dispensing device for plastic substances or the like comprising a chest for receiving a quantity of the substance, means for applying pressure to the substance in the chest, an open-ended casing carried by the chest, inner and outer plungers slidably mounted in the casing, the bottom of the latter being above that of the former, a chamber in the casing beneath the plungers communicating with the interior of the chest, said chamber being adapted to receive a predetermined quantity of the substance under pressure from the chest, a blade extending downwardly from the inner plunger past the outer plunger adapted selectively to disconnect the chamber from the chest, a cut-off blade slidably mounted at the lower end of the casing, said blade being movable to close the opening in said lower end, and a pivotally mounted handle connected on one side of the pivot to the plungers and on the other side thereof to the cut-off blade, said handle being adapted successively to move the inner and outer plungers with the blade of the former downwardly to disconnect the chamber and discharge the substance therefrom, and to move the cut-off blade to cut the substance away from the device.

DAVID CALVERT GOULD.
ROBERT KENNETH LUSK.